United States Patent [19]

Morrison

[11] 4,135,808

[45] Jan. 23, 1979

[54] DOCUMENT FEEDER FOR A COPIER

[75] Inventor: Douglas I. Morrison, Norwalk, Conn.

[73] Assignee: Pitney-Bowes, Inc., Stamford, Conn.

[21] Appl. No.: 745,054

[22] Filed: Nov. 26, 1976

[51] Int. Cl.$^2$ ............................................. G03G 15/00
[52] U.S. Cl. ........................................ 355/14; 271/94; 271/245; 355/76
[58] Field of Search ............................ 355/14, 3 R, 76; 271/276, 94, 235, 265, 245

[56] References Cited

U.S. PATENT DOCUMENTS

| | | | |
|---|---|---|---|
| 3,241,831 | 3/1966 | Axlid | 271/265 X |
| 3,309,078 | 3/1967 | Nash | 271/276 X |
| 3,473,035 | 10/1969 | Gardner et al. | 271/265 X |
| 3,698,706 | 10/1972 | Mihojevich | 271/276 X |
| 3,863,912 | 2/1975 | Korff | 271/245 |
| 3,926,426 | 12/1975 | Toriumi et al. | 271/265 X |

Primary Examiner—Richard L. Moses
Attorney, Agent, or Firm—Thomas R. FitzGerald; William D. Soltow, Jr.; Martin D. Wittstein

[57] ABSTRACT

A document feeder for an electrostatic copier of the type which includes instrumentalities for flash illuminating a document placed by an operator at the illuminating station of the copier. The document feeder includes an evacuatable enclosure having apertured upper and lower walls, and a flexible perforated belt endlessly looped about the enclosure. In addition, the document feeder includes instrumentalities for driving the belt in an endless path of travel including an upper belt run, wherein the belt perforations are disposed in air flow communication with the upper wall apertures, and a lower belt run, wherein the belt perforations are disposed in air flow communication with the lower wall apertures. When a document is delivered to the upper belt run, air drawn through the belt perforation holds the document in contact with the belt as the belt feeds the document to the lower belt run, where air drawn through the belt perforations holds the document in contact with the belt as the belt moves the document through the copier's illuminating station. Preferably, apparatus is provided for blocking movement of the document, but not the belt, through the illuminating station. During such time as the document is blocked, the moving belt slips relative to the blocked document.

14 Claims, 5 Drawing Figures

DOCUMENT FEEDER FOR A COPIER

BACKGROUND OF THE INVENTION

Commercially available electrostatic copying machines or copiers, generally include processing apparatus for forming and developing an electrostatic latent image on a moving photoreceptor and thereafter transferring the developed image from the photoreceptor to a copy sheet made of a suitable material such as paper.

As shown in U.S. Pat. No. B481,048, issued Mar. 16, 1976 to John A. Toto et al, many of such copiers are provided with well-known means for flash illuminating a document, placed by the operator at the copier's document illuminating station, typically a glass platen, to expose the photoreceptor with light modulated by the graphic information on the document. Whereupon, the photoreceptor selectively conducts to form the electrostatic latent image on the photoreceptor. The intensity of the light utilized for flash illumination purposes is so great that a document can be sufficiently illuminated for copying purposes while it is in motion at the illuminating station, since the time period required for photoreceptor imaging purposes is on the order of (10) milliseconds or less. Since the document can be copied while it is in motion it is not essential to retain the document at the illuminating station unless it is desired to make multiple copies of the document.

It is therefore advantageous to provide a document feeder for a copier of the type which utilizes flash illuminating means, to permit an operator to take advantage of the rapidity with which copies can be made by avoiding the time consuming task of carefully locating successive documents at the illuminating station. Further, inasmuch as the document may be in motion at the illuminating station when making copies utilizing such copiers, prior art document feeders such as that shown in U.S. Pat. No. 3,623,806, issued Nov. 30, 1971 to Jerome M. Short, may be simplified by permitting movement of a document at the illuminating station whether or not the document is retained at that station. Accordingly:

An object of the present invention is to provide a document feeder for use with a copier of the type which includes means for flash illuminating a document to be copied; and Another object is to provide a simplified document feeder for a copier of the type which utilizes flash illuminating means for making copies of a document.

SUMMARY OF THE INVENTION

A document feeder for a copier of the type which includes a photoreceptor, a document illuminating station and means operable for flash illuminating a document at the illuminating station. The document feeder comprises vacuum means including an enclosure and means for evacuating the enclosure. The enclosure includes a top wall and bottom wall each having a plurality of apertures formed therein. When the document feeder is mounted on the copier the lower wall apertures are located at the illuminating station. The document feeder also includes a flexible belt, having a multiplicity of perforations formed therein longitudinally of its length, and means for moving the belt in a path of travel which includes a first belt run wherein the belt perforations are disposed in air flow communication with the enclosure's top wall apertures, and a second belt run wherein the belt perforations are disposed in air flow communication with the enclosures's lower wall apertures, whereby the vacuum means and moving belt cooperate with each other to feed a document to and through the illuminating station. Preferably the document feeder also includes means for coordinating document movement with operation of the flash illuminating means.

BRIEF DESCRIPTION OF THE DRAWINGS

As shown in the drawing, wherein like reference numerals designate like or corresponding parts.

DESCRIPTION OF THE PREFERRED EMBODIMENT

Figure 1:
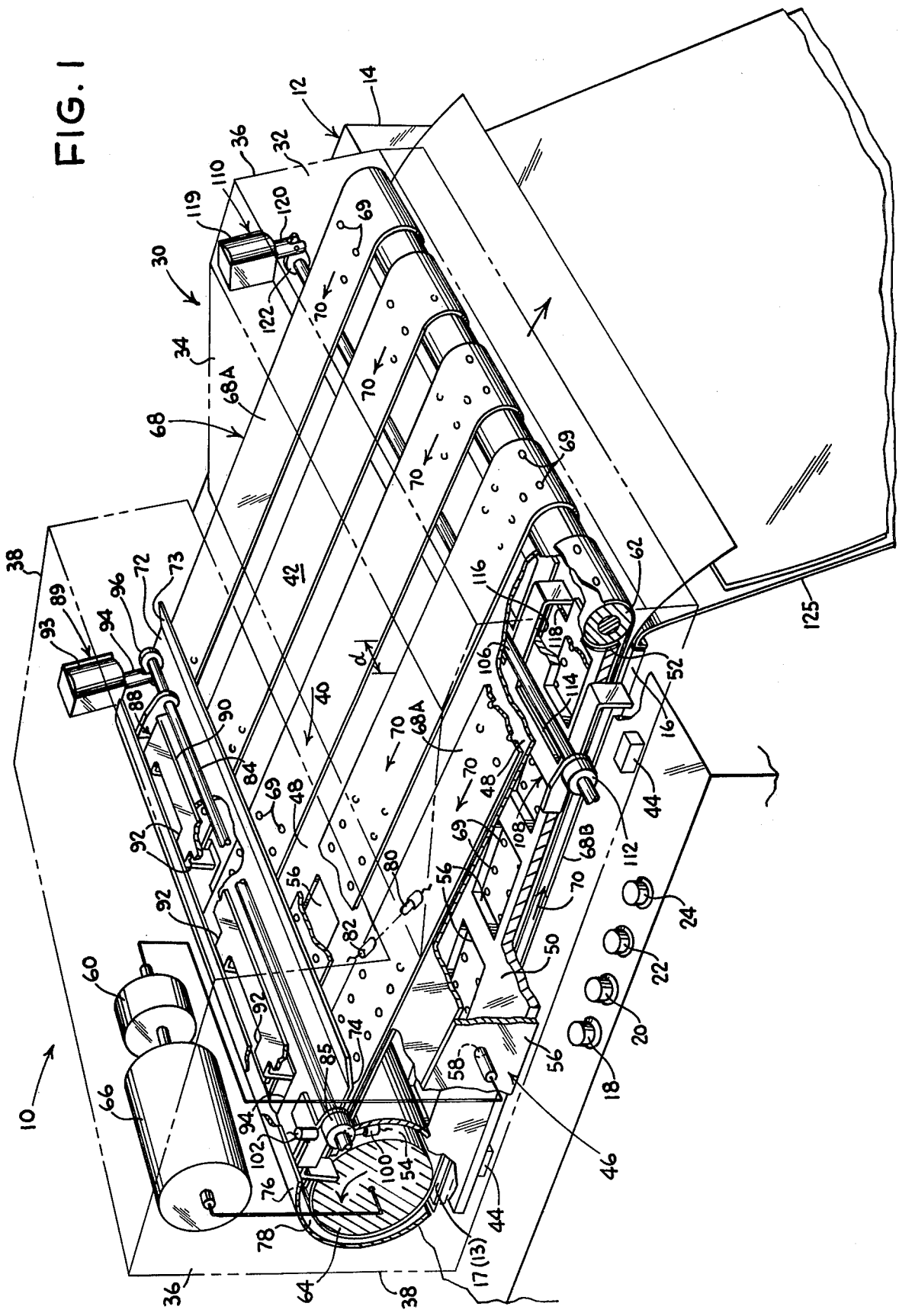
FIG. 1 is a perspective view of an electrostatic copier including a document feeder in accordance with the invention.

As shown in FIG. 1, a document feeder 10, in accordance with the present invention, is shown mounted on a copier 12 over the document illuminating station 13 of the copier 12. The copier 12 comprises suitable framework 14 for supporting the various processing means of the copier 12, including a glass platen 16, on which an operator ordinarily places a document (not shown) having graphic information to be copied. The upper surface 17 of the glass platen 16 generally defines the illuminating station 13 of the copier 12. The processing means includes such instrumentalities as a suitable photoreceptor (not shown) and suitable electro-optical means (not shown) for flash illuminating a document at the illuminating station 13 to expose the photoreceptor with the grapic information to be copied. In addition, the processing means comprises suitable well-known means for controlling the various processing instrumentalities of the copier 12, including a main power switch 18 for energizing the copier, a print switch 20 for commencing a copying cycle,, a selector switch 22 for choosing the number of copies to be made, and a jam indicating lamp 24 of general utility.

As shown in FIG. 1, the document feeder 10 comprises a housing 30 having a front wall 32, top wall 34, opposed side walls 36 and a rear wall 38. The top wall 34 has an elongated aperture 40 formed therein which longitudinally extends substantially parallel to the front wall 32 and between the side walls 36. The top wall 34 includes a ramp-like surface portion 42, which extends downwardly and rearwardly from the front wall 32 to the aperture 40 for guiding a document placed on the top wall 34 downwardly and through the aperture 40. In addition, the housing 30 includes a plurality of suitably located footings 44 for removably supporting the document feeder 10 on the copier 12 and, in particular, over the glass platen 16.

The document feeder 10 additionally includes an evacuatable enclosure 46 disposed within the housing 30 and suitably fixedly attached thereto. The enclosure 46 is formed by a sloped upper wall 48, a horizontally-extending lower wall 50, an inwardly curvedly-extending front wall 52, an inwardly curvedly-extending rear wall 54 and opposed side walls 56. The vertical height of the curved front wall 52 is less than that of the curved rear wall 54, as a result of which the upper wall 48 slopes upwardly from the front wall 52 to the rear wall 54. Further, the upper and lower walls 48 and 50 are each provided with a plurality of air inlet apertures 56. The apertures 56 in the upper wall 48 are located at spaced intervals rearwardly of the housing aperture 40, whereas the apertures 56 in the lower wall 50 are located at spaced intervals throughout the lower wall 50. In addition, one of the side walls 56 is provided with an air outlet aperture 58, for connecting the enclosure 46 in air flow communication with a suitable source of supply of lower pressure air within the housing 30, such as a fan 60.

The document feeder 10 also includes a front roller 62 and a rear drive roller 64. The rollers 62 and 64 are respectively nested within the curves of the enclosures front and rear walls 52 and 54 so that the latter walls 52 and 54 extend substantially tangentially of the outer surfaces of the respective rollers 62 and 64. The rear roller 64 is connected to a suitable source of supply of motive power within the housing 30, such as a motor 66 adapted by well-known means to be connected to the copier control means. Preferably, the motor 66 is coupled to the fan 60 to drive the fan 60 when motor 66 is energized.

In addition, the document feeder 10 includes a plurality of endless belts 68, each of which has a multiplicity of closely spaced perforations 69 formed therein longitudinally of its length. The belts 68 are looped about the front and rear rollers, 62 and 64, and about and in surface-to-surface contact with the upper and lower enclosure walls 48 and 50. The belts 68 are each separated from the next adjacent belt 68 a predetermined distance "d" and frictionally driven in endless paths of travel 70 by the moving drive roller 64. Each of the belts 68 has an upper belt run 68A, to which a document may be delivered, and a lower belt run 68B. The belt perforations 69 in the respective upper and lower belt runs 68B are disposed in air flow communication with the enclosure's respective upper and lower wall apertures 56, to permit air to be drawn through the belts 68 and into the enclosure 46 via the respective upper and lower wall apertures 56. Further, the outer surfaces of the respective belts 68 act as a moving bottom wall for the housing 30, and thus the document feeder 10. With the document feeder 10 mounted as shown over the glass platen 16 of the copier 12, the belts 68 are disposed in sufficiently close proximity to the top surface 17 of the glass platen 16 that a document disposed anywhere between the belts 68 and the platen surface 17 is disposed at and in the illuminating station 13 of the copier 12.

The document feeder 10 also includes means for guiding a document into contact with the respective belts 68, including a first elongated plate 72 having an upwardly extending lip portion 73. The plate 72 is suitably fixedly attached to the housing 30 so as to extend transverse to the path of travel 70 of the moving belts 68, in covering relation to the slopeing enclosure wall 48 and in sufficiently close proximity to the belt to form therewith a suitably narrow passageway 74 to permit the plate 72 to urge documents into surface-to-surface contact with the moving belts 68. The guiding means also includes a second elongated plate 76, having a curvedly-extending transverse cross-section. The plate 76 is suitably fixedly attached to the housing 30 so as to extend transverse to the path of travel 70 of the moving belt 68, and in sufficiently close proximity to the belt to form therewith a suitably narrow passageway 78 to permit the plate 76 to curvedly urge documents into surface-to-surface contact with the moving belts 68.

The document feeder 10 also includes means for coordinating movement of a document fed through the aperture 40 flash illuminating means of the copier 12. To that end, the coordinating means preferably includes a suitable means for sensing the presence of a document delivered to the belts 68 via the aperture 40, such as a lamp 80 spaced apart from a photocell 82. The lamp 80 and photocell 82 are respectively located on opposite sides at the aperture 40 for generating a signal indicating that a document has been delivered to the belts 68. The lamp 80 and photocell 82 are adapted to be suitably electrically connected by well-known means between the copier's power switch 20 and the motor 66 to act as a switch for energizing and deenergizing the motor 66 when the power switch 20 is turned to the "on" position.

In addition, the coordinating means includes first gate means comprising an elongated shaft 84, a comb-like member 88, solenoid means 89, and suitable sensing means. The shaft 84 is suitably rotatably connected to the housing 30, as by means of plural bearings 85, so as to extend across and transverse to the path of travel 70 of the moving belts 68. The comb-like member 88 is suitably fixedly attached to the shaft 84 for rotation therewith and includes a spine portion 90 and a plurality of equidistantly-spaced teeth 92. The teeth 92 extend rearwardly from the spine portion 90, downwardly through appropriately spaced slots 94 formed in the first plate 72 in registration with the spaces between the belts 68. As so located, the teeth 92 obstruct movement of a delivered document as it is being carried on the moving belts 68, as a result of which the document slips relative to the moving belts 68. Of course, the moving belts 68 urge the leading edge of the document into alignment with the teeth 92, as a result of which the leading edge of the delivered document is aligned transverse to the direction of the path of travel 70 of the moving belts 68. The solenoid means 89 is adapted to be suitably operatively connected by well-known means to the control circuitry of the copier 12 for energization when a document is aligned with the teeth 92. The solenoid means 89 includes a coil 93, and a plunger 94 suitably pivotably secured to a lever arm 96 extending from and fixedly attached to the shaft 84; whereby when the coil 93 is electrically energized the plunger 94 raises the lever arm 96, to rotate the shaft 84 and thus the comb-like member 88, clockwise. When the shaft 84 is thus rotated, the teeth 92 are raised out of the path of travel of a document being carried by the belts 68, permitting the belts 68 to continue feeding the document through the document feeder 10. The sensing means suitably includes a lamp 100, spaced apart from a photocell 102. The lamp 100 and photocell 102 are respectively suitably attached to the housing 30 to align the lamp 100 and photocell 102 with one of the spaces between the belts 68 and on opposite sides of a document disposed on the belts 68. The lamp 100 and photocell 102 generate a signal indicating that a document is located at the teeth 92. The lamp 100 and photocell 102 are adapted to be suitably electrically connected by well-known means to the solenoid coil 93, copier print switch 20 and selector switch 22, to timely raise the teeth 92 for positioning the delivered document at the illuminating station for flash illumination purposes.

Further, the lamp 100 and photocell 102 may be suitably electrically connected to the jam indicator lamp 24 to timely light the lamp 24 if the delivered document does not clear the teeth 92 after the teeth 92 are raised.

The coordinating means also preferably includes second gate means comprising a second elongated shaft 106, a second comb-like member 108 and a second solenoid means 110. The shaft 106 is suitably rotatably connected to the housing 30, as by means of plural bearings 112, so as to extend within, and through the enclosure 46, and transverse to the path of travel 70 of the moving belts 68. The second comb-like member 108 is suitably fixedly attached to the shaft 106 within the enclosure 46 for rotation with the shaft 106 and includes a second spine portion 114 and a plurality of equidistantly spaced teeth 116. The teeth 116 extend forwardly from the spine portion 114, downwardly through a plurality of correspondingly spaced slots 118, formed in the enclosure's lower wall 50, and between the respective belts 68 so as to obstruct forward movement of a document being carried by the moving belts 68. Accordingly, a delivered document is held in place at the illuminating station 13 by the teeth 116 causing the document to slip relative to the moving belts 68. Of course, the teeth 116 align the leading edge of the document, for a second time, along a line extending transverse to the path of travel 70 of the moving belts 68. The second solenoid means 110 is adapted to be suitably operatively connected by well-known means to the control circuity of the copier 12 for energization thereby after the photoreceptor has been exposed a given number of times, corresponding to the number of copies selected by the operator's manipulation of the selector switch 22. The solenoid means 110 includes a coil 119 and plunger 120 suitably pivotably secured to a lever arm 122 extending from and fixedly attached to the shaft 106; whereby when the coil 119 is electrically energized the plunger 120 raises the lever arm 122 to rotate the shaft 106 and thus the comb-like member 108 counter-clockwise, to raise the teeth 116 out of the path of travel of a document held in surface-to-surface contact with the moving belts 68 by the evacuated enclosure 46, resulting in the document being discharged forwardly of the front roller 62. The coil 119 is preferably suitably electrically connected to the print switch 22 and selector switch 20 to energize the coil 119 after the copier has exposed the photoreceptor thereof the number of times which corresponds to the number of copies selected by the copy switch.

To collect discharged documents, the document feeder 10 includes a receptacle 125 suitably fixedly attached to the housing 30 so as to hang downwardly therefrom and across the front wall of the copier 12.

To operate the copier 12 and document feeder 10, the operator switches the power switch to the on position, thereby placing the copier in a stand-by mode of operation. The operator then places a document on the housing's ramp-like top wall surface 42 such that the surface of the document which includes the graphic information to be copied is disposed upwardly to face the operator, rather than downwardly and in contact with the housing's top wall 34. When the document is fed downwardly through the housing aperture 40, it is passed between the lamp 80 and photocell 82, which signals the copier 12 to energize the motor 66 and thus the fan 60.

Energization of the motor 66 commences rotation of the drive shaft 64 which, in turn, frictionally drives the respective belts 68 in the direction of their respective paths of travel 70. The fan 60 evacuates the enclosure 46, resulting in air being drawn through the belts 68 and enclosure's upper wall apertures 56. As a result, the document is urged into engagement with the moving belts 68 and carried thereby into contact with the teeth 92 of the first gate means. When thus situated, the document is disposed between the lamp 100 and photocell 102, which, after the belts 68 have driven the leading edge of the document into alignment with the respective teeth 92, energize the solenoid coil 93 to raise the teeth 92, thereby permitting the belts 68 to carry the document forwardly and into the passageways 74 and 78. In addition, the lamp 100 and photocell 102 timely signals the print switch 22 to start the copier's photocopying cycle. The evacuated enclosure 46 and belts 68 cooperate with each other to feed the document through the passageways 74 and 78, which turn the document 180 degrees, so that the information bearing surface of the document is disposed downardly and face-to-face with the copier's glass platen 16. After the document is disposed in contact with the lowered teeth 116, the copier 12 flash illuminates the document to expose the photoreceptor. After the document is flash illuminated the copier 12 signals the second solenoid means 110 to raise the teeth 116. When multiple copies are to be made the document is flash illuminated by the copier 12 the number of times that has been selected by the selector switch 22. When the number of exposures of the copier photoreceptor corresponds to the number of copies selected by the operator's manipulation of the selector switch 20, the solenoid coil 119 is energized by the copier 12 to raise the teeth 116 out of the path of travel of the document. The moving belts 68, then continue to forwardly feed the document a sufficient distance to permit the document to be discharged thereby into the processed document receptacle 125; whereupon, the copier 12 returns to its stand-by mode of operation and deenergizes the document feeder motor 66 and thus the fan 60.

Inasmuch as each subsequently discharged document is fed on top of the previous document in the receptacle 125, the documents are collated in the same order they are fed to the document feeder 10.

In accordance with the objects of the invention there has been described a document feeder for a copier of the type which includes means for flash illuminating a document to expose a photoreceptor to an image corresponding to the graphic information on the document.

Inasmuch as certain changes may be made in the above described invention without departing from the spirit and scope of the same, it is intended that all matter contained in the above description or shown in the accompanying drawings shall be interpreted in an illustrative rather than limiting sense. And, it is intended that the following claims be interpreted to cover all the generic and specific features of the invention herein described.

What is claimed is:

1. In combination with a copier having a document illuminating station and including a photoreceptor and means operable for flash illuminating a document at the illuminating station to form an image on the photoreceptor which corresponds to information on the document, a document feeder comprising:
    (a) vacuum means including an enclosure and means for evacuating the enclosure, the enclosure including top and bottom walls respectively having a plurality of apertures formed therein, the lower wall apertures located at the illuminating station;
    (b) a plurality of spaced apart, smooth, flexible belts having a multiplicity of perforations formed therein longitudinally of their length, said belts endlessly looped about said enclosure, means for moving said belts in an endless path of travel, said path of travel including a plurality of upper belt runs to which a document may be delivered and a plurality of lower belt runs to which a delivered document is fed by said belts, the belt perforations in said upper belt runs disposed in air flow communication with said top wall apertures, the belt perforations in said lower belt runs disposed in air flow communication with the bottom wall apertures, whereby said vacuum means and said moving belts cooperate with each other to feed a delivered document to and through the illuminating station as said delivered document is held in contact with said moving belts; and (c) means adapted to be interconnected to the copier for coordinating document movement with operation of said flash illuminating means for copying said moving document.

2. The document feeder according to claim 1 wherein the coordinating means includes means for temporarily blocking document movement through the illuminating station for making multiple copies of the document.

3. The document feeder according to claim 1, wherein said coordinating means includes means responsive to delivery of a document to said upper belt run for energizing said belt moving means and said evacuating means.

4. The document feeder according to claim 1, wherein said coordinating means includes means cooperative with the moving belts for aligning the leading edge of a delivered document transverse to the direction of the path of travel of the belts prior to feeding said document to the illuminating station.

5. The document feeder according to claim 4, wherein said coordinating means includes means responsive to the presence of a delivered document at said aligning means for signalling the copier to timely commence a printing cycle.

6. The document feeder according to claim 1 wherein said coordinating means comprises:
   a. movable comb-like member including a plurality of teeth, and
   b. means for moving said comb-like member to move said teeth into and out of the path of travel of a delivered document.

7. A document feeder adapted for use with an electrostatic copier, said copier having a platen at an illumination station and including means operable for flash illuminating a document at the illuminating station, the document feeder comprising:
   a. a housing adapted to be seated on the copier over the illuminating station;
   b. an evacuatable enclosure within the housing, said enclosure including top and bottom walls having a plurality of apertures formed therein, means for evacuating the enclosure, said apertured bottom wall disposed above the platen at the illuminating station when the document feeder is seated on the copier;
   c. a plurality of spaced apart, smooth, flexible belts having a multiplicity of perforations formed therein, means for moving said belts in an endless path of travel from a document delivery position to and through the illuminating station, said endless path of travel including a plurality of upper belt runs to which a document may be delivered at said delivery station and a plurality of lower belt runs to which a delivered document is fed by said belts to said illuminating station, with the belt perforations in said upper belt runs at said delivery station disposed in air flow communication with the apertures in the top wall of the enclosure and the belt perforations in said lower belt runs at said illuminating station disposed in air flow communication with the apertures in the bottom wall of the enclosure, whereby said moving belts and said evacuated enclosure cooperate to hold a delivered document in contact with the moving belts and to feed the delivered document through the illuminating station; and
   d. means adapted to be interconnected to the copier for coordinating document movement with operation of the flash illuminating means for copying said moving document.

8. The document feeder according to claim 7, wherein said belt is endlessly looped about the enclosure.

9. The document feeder according to claim 7, wherein said means for moving the belt includes a drive shaft, and wherein said belt is endlessly looped about the drive shaft and the enclosure.

10. The document feeder according to claim 7 including means for evacuating the enclosure, and said means for moving the belts coupled to said evacuating means.

11. The document feeder according to claim 7, wherein said coordinating means for signaling the copier that a document has been delivered to the document feeder.

12. The document feeder according to claim 7, wherein said coordinating means includes means for retaining a delivered document at the illuminating station for making multiple copies of the document.

13. The document feeder according to claim 9 wherein said coordingating means includes means for orienting the leading edge of a delivered document with respect to a reference direction prior to feeding said document to the illuminating station.

14. The document feeder according to claim 9 wherein said coordinating means icnludes means for obstructing movement of a delivered document through the illuminating station, whereby the belt moves relative to the obstructed document.

* * * * *

UNITED STATES PATENT AND TRADEMARK OFFICE
CERTIFICATE OF CORRECTION

PATENT NO. : 4,135,808
DATED : January 23, 1979
INVENTOR(S) : Douglas I. Morrison It is certified that error appears in the above—identified patent and that said Letters Patent is hereby corrected as shown below:

Column 1, line 6 delete "," after the word -- copiers --.

Column 3, line 51 change "slopeing" to -- sloping --.

Column 6, line 10 change "downardly" to -- downwardly --.

In the Claims:

Column 8, line 39 Claim 11; after --coordinating means -- insert -- includes means --.

Column 8, line 47 Claim 13; change "coordingating" to -- coordinating --.

Column 8, line 52 Claim 14; change "icnludes" to -- includes --.

Signed and Sealed this

Twentieth Day of October 1981

[SEAL]

Attest:

GERALD J. MOSSINGHOFF

Attesting Officer

Commissioner of Patents and Trademarks